Nov. 26, 1963 W. NUTTER ETAL 3,111,718
APPARATUS FOR TREATING TEXTILE MATERIALS
Filed Jan. 11, 1961 2 Sheets-Sheet 1

United States Patent Office 3,111,718
Patented Nov. 26, 1963

3,111,718
APPARATUS FOR TREATING TEXTILE
MATERIALS
Walter Nutter, Simonstone, near Burnley, Stanley Lewis
Cole, Helmshore, Rossendale, David Thomas Denson,
Oldham, and William Slater, Uppermill, near Oldham,
England, assignors to T.M.M. (Research) Limited, Oldham, England, a British company
Filed Jan. 11, 1961, Ser. No. 81,995
Claims priority, application Great Britain Jan. 15, 1960
3 Claims. (Cl. 19—105)

The invention is concerned with a method of and means for the treatment of textile fibrous material preparatory to and during carding operations, and it relates more particularly to the carding unit, to the means by which this is supplied with material, and to the means for removal therefrom of the carded output slivers.

The invention provides for use in the circumstances referred to an apparatus including the assembly of a battery of carding machines and conveying means arranged to discharge material successively into the intake elements of said carding machines.

Figure 1:
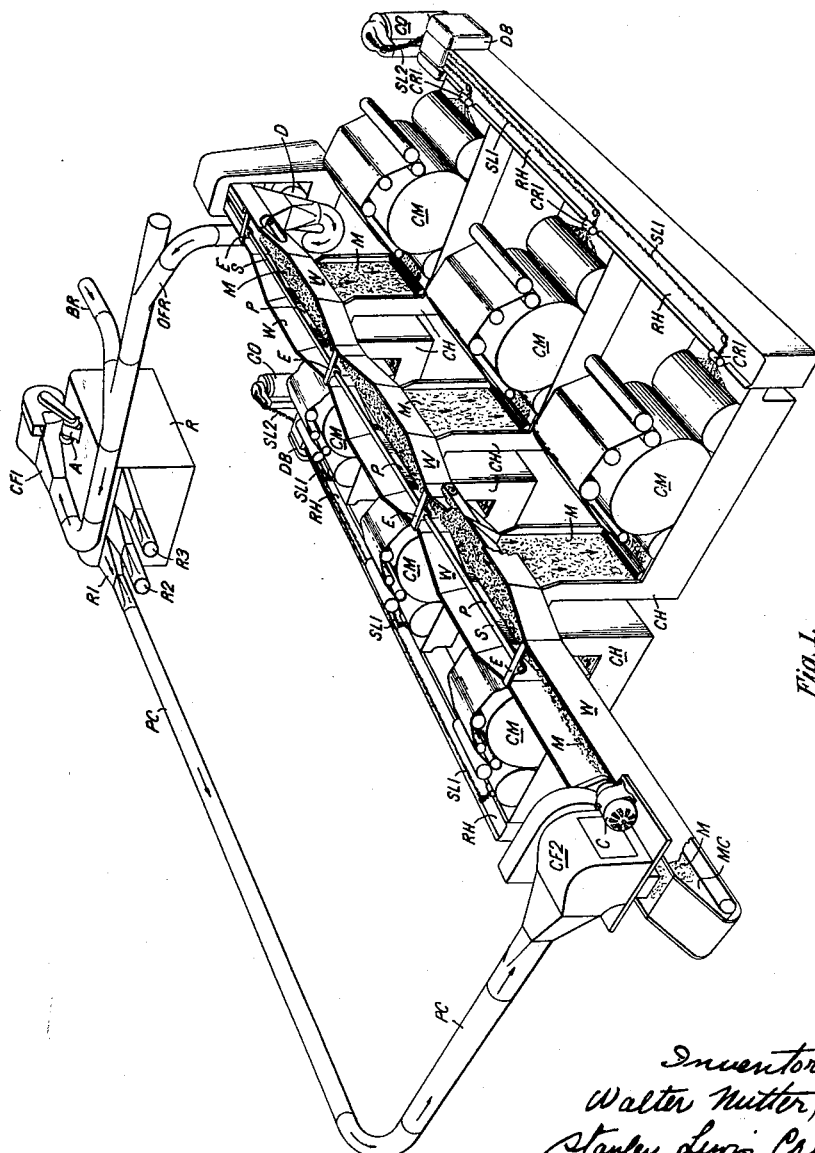
Figure 2:
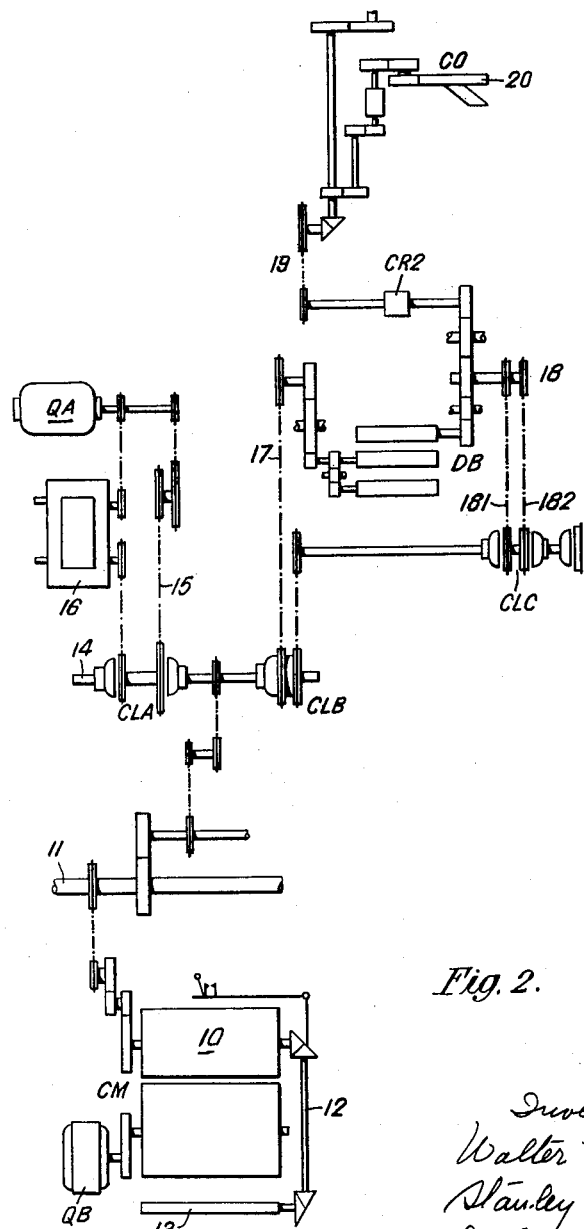

One embodiment of the invention is illustrated by way of example in the accompanying diagrammatic drawings, of which FIG. 1 is a perspective view of the plant as a whole and FIG. 2 is a schematic view of the driving mechanism for the several components and the gearing relating thereto.

In the drawings, as shown more clearly in FIG. 1, the primary pneumatic conveyor by which the pre-opened material is supplied from the blow-room is indicated at BR. This conveyor terminates in a combined condenser and fan unit CF1 which is driven by an electric motor A, and by which the material undergoes a partial condensation as it is delivered into a reservoir R. The reservoir R may be of sufficient capacity to supply a number of separate carding plants each of which is fed by its individual secondary pneumatic conveyor trunk PC connected to one of the outlet branches R1, R2, R3, etc.

The secondary pneumatic conveyor trunk PC of each carding plant leads to a combined condenser and fan unit CF2 which is driven by an electric motor C and is arranged to deposit the compacted material by gravity upon the upper course of an endless belt conveyor MC continuously driven by an electric motor D. The said conveyor MC is confined between vertical side-walls W, W which combine with the upper course of the conveyor to form a channel through which the material, indicated at M, is transported towards the carding battery.

Disposed respectively along either side of said conveyor MC are two groups of carding machines CM, arranged in parallel, the taker-in of each such machine being fed by a vertical gravity chute CH the open mouth of which is located alongside and slightly below the level of the upper course of the conveyor belt. Supported above the conveyor MC on bearers E, E is a longitudinal shaft S which carries a series of paddle-like blades or protruding elements P, P at spaced positions opposite the respective pairs of carding machine intake elements or chutes CH. Said shaft S is suitably geared to the conveyor driving motor D so that when the conveyor is in operation the shaft and paddles P are oscillated to execute transverse sweeping movements of the blades by which material is discharged into the chutes CH. The height of the blades P relative to the surface of the conveyor MC may be adjustable to vary the quantity of material discharged laterally from the conveyor at each stroke of the paddles. The delivery to the chutes may be stopped if required by suitably adjusting the heights of the blades P or by other means.

Material M in excess of the requirements of the carding machines CM is returned to the reservoir R through the overfeed return trunk OFR which collects the excess material falling from the end of the belt conveyor MC and passes it back into the trunk BR.

The exhauster fans which are incorporated in the two condenser units CF1 and CF2 are conveniently used to induce the air currents in the pneumatic trunks BR, OFR and PC, whereby material is conveyed to the reservoir, and to the intake of the belt conveyor MC.

From each group of carding machines CM, the several output slivers SL1, SL1 emerge through pairs of calender rolls CR1 and are collected upon a railway-head delivery table RH and transported continuously whereupon in side-to-side relationship to a draw-box DB, a suitable form of which may comprise three lines of drafting rollers giving a total draft ranging between 3 and 10, means being provided for varying the draft and roller spacings in both zones. Suctional means for removing liberated fly from the atmosphere at the drafting and calendering zones are preferably provided. The collected slivers on the table RH are drafted, combined and delivered as a single sliver SL2 by calender rollers CR2 (FIG. 2) to a coiler CO for packaging in cans which are creeled as required at a draw-frame.

The combined pneumatic and mechanical conveyor circuit BR, PC, MC and OFR may be controlled separately from the remainder of the plant, so that it may continue in operation even when all the carding machines CM are out of action. The electric motors A, B and D are electrically interlocked to ensure that delivery from the reservoir R will cease in the event of a blockage in the conveyor system.

The feed elements or protruding elements P and the doffers of each row of carding machines CM, and the draw-box DB and coiler CO operating in conjunction therewith, are all driven by a common electric motor QA through clutches and variable-speed units as hereinafter described. The main carding cylinder of each machine CM is driven separately by an electric motor QB.

From FIG. 2 it will be seen that the doffer cylinder 10 of the carding machine CM is driven from a line-shaft 11, which serves also to drive the doffers of the remaining carding machines of the group. The doffer drive is transmitted through the side shaft 12 to the feed roller of the carding machine at 13. The shaft 11 is driven by the motor QA through the medium of an intermediate shaft 14, the speed of which can be varied by operation of the electro-magnetic clutch unit CLA to select either a direct drive through the gear-train 15 or the alternative drive through a variable-speed unit 16.

Another electro-magnetic clutch CLB on the intermediate shaft 14 is used to transmit drive to the intermediate and back rolls of the draw-box DB through the gear-train 17 and to the front roll of said draw-box through a gear-train 18 which latter includes two alternative drives 181 and 182, either of which may be selected by a clutch CLC, for alteration of the draft. The clutch CLC is operated by means of any conventional device for detecting the braking of a sliver. Said clutch may also be operated manually by the machine attendant working a pushbutton control circuit. From the last member of the gear-train 18 is driven the draw-box calender rolls CR2 and a further drive is taken from the latter through the gear-train 19 to the tube-plate 20 of the coiler CO.

The clutch CLA can select either fast or slow speed drives 15 or 16, the two drives being electrically interlocked so preventing their simultaneous engagement. When the plant is first started, and material is being brought through from the carding machines to the railway head, the clutch CLB is de-energised to immobilise the draw-box DB and coiler CO.

Near to the draw-box DB there are provided four control buttons respectively for (a) slow speed drive at clutch CLA, plus normal drive at clutch CLB, (b) fast speeds drive at clutch CLA plus normal drive at clutch CLB, (c) inching through both clutches at slow speed, and (d) stop by disengaging both clutches.

The slivers from the several carding machines are inched through the drawbox and coiler and the plant may then be started at slow speed and if found to be running satisfactorily, the fast speed drive may be engaged. On stopping the plant, the clutch CLA is de-energised whilst the clutch CLB is kept energised so that all parts of the system decelerate simultaneously and build-up or stretch of the slivers on the railway head table is prevented.

Stop motions may be provided, one at each carding machine between the calender rollers CR1 at the doffer output and the railway head table RH, so that a failure in the carded sliver delivery will operate the stop-motion, and a second between the draw-box DB and the coiler CO to stop delivery on failure of material at the draw-box. A roller-lap stop-motion may be fitted to the draw-box. In all cases the stop-motion circuits are arranged when operated to de-energise the clutch CLA. Delivery may be resumed after operation of a stop-motion by pressing a stop button to re-set the stop-motion circuit after which the draw-box start button may be operated.

What we claim as our invention and desire to secure by Letters Patent is:

1. Apparatus for the treatment of textile fibrous material preparatory to spinning, including the assembly of a battery of carding machines having intake elements therefor, comprising a conveyer arranged to carry material for discharge successively into said intake elements of said carding machines, a shaft having spaced protruding elements, said shaft being disposed longitudinally of said conveyer, said protruding elements being disposed for sweeping material carried on said conveyer in a horizontal lateral direction therefrom, and each said intake element of each carding machine being positioned to receive such laterally swept material.

2. Apparatus as claimed in claim 1, wherein the carding machines are arranged in two parallel rows, back to back, with their intake elements disposed on either side of the longitudinal center-line of said conveyor, said conveyor being located above the intake elements and comprising an endless belt.

3. Apparatus as claimed in claim 2 wherein said spaced protruding elements are supported above said conveyer and consist of paddle like elements mounted upon said shaft, one such paddle like element being located opposite the intake elements of two back to back carding machines, and wherein said paddle like elements are oscillated so as to be capable of discharging material from the conveyer alternately to the intake elements of carding machines on either side thereof.

References Cited in the file of this patent

UNITED STATES PATENTS

| | | |
|---|---|---|
| 418,087 | Thomas | Dec. 24, 1889 |
| 1,875,356 | Shaw | Sept. 6, 1932 |
| 2,964,802 | Hideo Aono et al. | Dec. 20, 1960 |